Patented May 20, 1947

2,420,809

UNITED STATES PATENT OFFICE 2,420,809

ACTIVATORS FOR TERPENE THIOCYANO-ACYLATE INSECTICIDES

Joseph N. Borglin, Wilmington, Del., assignor to Hercules Powder Company, Wilmington, Del., a corporation of Delaware No Drawing. Application June 30, 1942, Serial No. 449,152

6 Claims. (Cl. 167—24)

This invention relates generally to insecticides, and more particularly, to a group of activating agents adapted to activate the toxic effect of an insecticide comprising a mixture of terpene and plant body compounds.

Naturally occurring contact insecticides such as pyrethrum, rotenone and the like have been found to have a higher knockdown value than most synthetic insecticides as, for example, the terpene thiocyanoacylates. On the other hand terpene thiocyanoacylates are known to have a higher kill rating than the naturally occurring insecticides as, for example, pyrethrum. A combination of pyrethrum and a terpene thiocyanoacylate is known to result in an insecticide which has a higher kill rate than either the synthetic or natural insecticide taken alone.

Now, in accordance with this invention, it has been discovered that the kill rate of the combination pyrethrum-terpene thiocyanoacylate insecticide may be increased by means of an activating agent which, when added to the mixture, increases the killing power of the insecticide and preserves the mixture against deterioration.

Plant bodies suitable for admixture with a toxic terpene compound and which mixture is susceptible to activation with the activating agents are: pyrethrum flower extract, powdered pyrethrum flowers, nicotine, rotenone, extracts from derris root, cube root, timbo, devil's shoestring, barbasco, etc., powered roots of derris, cube, timbo; toxic rotenone derivatives, such as dihydrorotenone and acetyl rotenone; rotenoids, such as deguelin, toxicarol, etc. By "plant body," used herein and in the claims, is meant the toxic ingredients extracted from plant bodies, or the plant body reduced to a powdered or finely divided state or a mixture thereof.

Toxic terpene compounds suitable for admixture with any one of the above mentioned plant bodies are those terpene compounds having the general type formula ROOC—R'XCN or modifications thereof in which R is a terpene radical of any unsaturated terpene hydrocarbon as, for example, pinene, terpinene, terpinolene, camphene, dipentene, menthene, allo-ocimene, commercial mixtures of terpene hydrocarbons such as, for example, turpentine. R may be a terpene radical of any saturated or unsaturated terpene alcohol as, for example, terpineol, borneol, fenchyl alcohol, hydro-terpineol, terpene alcohols resulting from the condensation of formaldehyde, with dipentene, pinene, and allo-ocimene, the terpene alcohol resulting from the condensation of allo-ocimene and crotonaldehyde, terpene polyhydric alcohols as, for example, 1–4 and 1–8 terpin and the hydrates thereof, and commercial mixtures thereof as, for example, pine oil. R' is a hydrocarbon residue of a carboxylic acid and X is a member of the group consisting of sulfur, selenium and tellurium.

Specific toxic terpene compounds are fenchyl thiocyano acetate, fenchyl alpha-thiocyano propionate, bornyl thiocyano acetate, isobornyl thiocyano acetate, hydro-terpineol thiocyano propionate, hydro-terpineol thiocyano acetate, dipentene thiocyano propionate, dipentene thiocyano acetate, pinene thiocyano acetate, allo-ocimene thiocyano acetate, bornyl thiocyano ricinoleate, fenchyl thiocyano ricinoleate, bornyl thiocyano naphthenate, isobornyl thiocyano naphthenate, fenchyl thiocyano naphthenate, 1–8 terpin dithiocyano propionate, 1–8 terpin dithiocyano acetate, 1–8 terpin dithiocyano butyrate, cineole thiocyano acetate, cineole thiocyano propionate, cineole thiocyano butyrate, etc.

The toxic terpene compound may be mixed with the plant body and the mixture extended in a suitable liquid inert carrier. The carrier liquid will usually be an inert relatively inexpensive liquid, such as water, deodorized kerosene (commonly referred to in the art as "Deo-Base") alcohol, acetone, petroleum oil, mineral oil, white oil, etc.

The terpene compound will, in most cases, comprise from a small proportion such as about 0.1% by weight up to about 10% by weight of the finished insecticide. For the ordinary spray insecticide of the type suitable for household use, a quantity between 1.0% and about 3% and specifically about 1.8% of the finished insecticide is preferred. However, insecticide concentrates suitable for dilution to form the finished insecticide may contain much higher quantities of the terpene compound and may consist entirely of the mixture of the plant body and terpene compound together with an activator of the novel group herein disclosed. The plant body will, in most cases, comprise from about 0.1% to about 10% (20 to 1 concentrate) by weight of the finished insecticide. For the ordinary spray insecticide of the type suitable for household use, a quantity between about 1.0% and about 3% and specifically about 1.2% depending upon the amount and type of terpene compound employed is preferred.

In accordance with this invention, an insecticide composition comprising a plant body and a terpene compound may be activated by means of phenols and phenyl ethers.

The activating agent may be added to the plant body terpene compound insecticide mixture in quantities of from about 0.0001% to about 5% of the insecticides and preferably from about 0.001% to 2%.

The following table illustrates the stable activating effect of the phenol type activator:

Table

| Ex. | Insecticide[1] | Activator | Wt., Per Cent | Knockdown | | 24 Hour Kill-rating | | | | 48 Hour Kill-rating | | | |
|---|---|---|---|---|---|---|---|---|---|---|---|---|---|
| | | | | Initial | 6 Mo. | Initial | Increase over Base | 6 Mo. | Increase over Base | Initial | Increase over Base | 6 Mo. | Increase over Base |
| 1 | Base | | None | 99.8 | 99.6 | +15.1 | | +16.6 | | +25.8 | | +26.5 | |
| 2 | do | Pyrogallol | 0.1 | 99.7 | 99.4 | +33.0 | 17.9 | +36.1 | 19.5 | +41.6 | 15.8 | +51.0 | 24.5 |
| 3 | do | Meta-cresol | 0.1 | 100.0 | 99.8 | +34.6 | 19.5 | +28.6 | 10.0 | +41.4 | 15.6 | +42.5 | 16.0 |
| 4 | do | Para-cresol | 0.1 | 99.5 | 99.5 | +28.8 | 13.7 | +25.2 | 8.6 | +40.2 | 14.4 | +40.5 | 14.0 |
| 5 | do | p-tertiary butyl catechol | 0.1 | 99.9 | 100.0 | +26.8 | 11.7 | +28.8 | 12.2 | +38.8 | 13.0 | +45.1 | 18.6 |
| 6 | do | Anisole | 0.1 | 99.3 | 100.0 | +20.7 | 5.6 | +37.4 | 20.8 | +30.7 | 4.9 | +50.2 | 23.7 |
| 7 | do | Phenetole | 0.1 | 99.8 | 98.9 | +33.5 | 18.4 | +28.6 | 12.0 | +41.2 | 15.4 | +41.7 | 15.2 |
| 8 | do | Beta-naphthol | 0.1 | 99.6 | 100.0 | +30.1 | 15.0 | +21.7 | 5.1 | +39.9 | 14.1 | +40.9 | 14.4 |
| 9 | do | Phenol | 0.1 | 99.8 | 99.4 | +29.6 | 14.5 | +29.0 | 12.4 | +37.4 | 11.6 | +45.5 | 19.0 |

[1] Basic insecticide: A terpene thiocyanoacylate, 1.8%; Pyrethrum concentrate (20:1), 1.2%; Deo-Base, 97%.

The activation of the basic insecticide is clearly shown by comparing the kill values for the unactivated base insecticides set forth in Example 1 with the kill values of the activated base insecticide set forth in Examples 2 through 9. The amount of activation may be noted under the column entitled "Increase over Base". These activation values may be considered as the amount of toxicity that may be realized in addition to the amount of toxicity already present in the unactivated basic insecticide. On the 24-hour kill-rating basis, activation values ranging from 5.6–19.5 were obtained under initial test. The values remained substantially constant under the six months' test which indicates that the activators exert a constant activating effect and do not lose their activating effect over a period of time. A relatively small quantity of activator is required to obtain results which increase the kill power of the insecticide in some instances more than 100 percent.

The above ratings are based on Peet-Grady tests when used against house flies. The insecticide mixture may be in mineral oil solution, mineral oil solutions which have been emulsified in water, or concentrated insecticide mixtures which may be emulsified in water. In any of these modified forms, the activators disclosed in the table produced the desired stabilizing effect.

The kill rating in each of the above examples is based on the average difference between the mortalities (per cent dead in 24 or 48 hours) obtained with the official test insecticide and the insecticide under test as determined by one comparison of each of three fly cultures at the time of test.

What I claim and desire to protect by Letters Patent is:

1. An insecticide composition comprising pyrethrum, a terpene thiocyanoacetate, and para-tertiary butyl catechol.

2. An insecticide composition comprising pyrethrum, a terpene thiocyanoacetate, and pyrogallol.

3. An insecticide composition comprising pyrethrum, a terpene thiocyanoacetate, and phenol.

4. An insecticide composition comprising a plant body contact insecticide selected from the group consisting of pyrethrum and rotenone, a terpene thiocyanoacylate and an activating agent selected from the group consisting of phenol, cresol, para-tertiary-butyl catechol, pyrogallol, and naphthol.

5. An insecticide composition comprising a plant body contact insecticide selected from the group consisting of pyrethrum and rotenone, a terpene thiocyanoacetate and an activating agent selected from the group consisting of phenol, cresol, para-tertiary-butyl catechol, pyrogallol, and naphthol.

6. An insecticide composition comprising pyrethrum, isobornyl thiocyanoacetate and pyrogallol.

JOSEPH N. BORGLIN.

REFERENCES CITED

The following references are of record in the file of this patent:

UNITED STATES PATENTS

| Number | Name | Date |
|---|---|---|
| 2,209,184 | Borglin | July 23, 1940 |
| 2,243,207 | Harville | May 27, 1941 |